United States Patent
Donahue, Jr. et al.

(10) Patent No.: US 12,310,350 B1
(45) Date of Patent: May 27, 2025

(54) FUMIGATION SYSTEM INJECTION CART

(71) Applicant: A2B, Acampo, CA (US)

(72) Inventors: William A Donahue, Jr., Modesto, CA (US); Alfred J. Dentone, Acampo, CA (US)

(73) Assignee: A2B, Acampo, CA (US)

( * ) Notice: Subject to any disclaimer, the term of this patent is extended or adjusted under 35 U.S.C. 154(b) by 119 days.

(21) Appl. No.: 18/240,015

(22) Filed: Aug. 30, 2023

Related U.S. Application Data

(60) Provisional application No. 63/403,260, filed on Sep. 1, 2022.

(51) Int. Cl.
*A01M 13/00* (2006.01)

(52) U.S. Cl.
CPC ........ *A01M 13/003* (2013.01); *A01M 13/006* (2013.01)

(58) Field of Classification Search
CPC ... A01M 13/00; A01M 13/003; A01M 13/006
See application file for complete search history.

(56) References Cited

U.S. PATENT DOCUMENTS

| | | | | |
|---|---|---|---|---|
| 1,222,677 A | * | 4/1917 | Sargent | A01M 13/003 111/7.1 |
| 1,863,584 A | * | 6/1932 | Tracy | A01M 13/003 43/129 |
| 3,554,687 A | * | 1/1971 | Cassidy | A61L 2/20 422/294 |
| 4,875,407 A | | 10/1989 | Inagaki | |
| 4,966,755 A | * | 10/1990 | Smith | A01M 13/00 417/208 |
| 5,365,692 A | * | 11/1994 | Gustafson | A01M 13/00 43/132.1 |

(Continued)

FOREIGN PATENT DOCUMENTS

| | | | | |
|---|---|---|---|---|
| CN | 106421844 A | * | 2/2017 | ............ A01M 13/00 |
| CN | 112314582 A | * | 2/2021 | ............ A01M 13/00 |
| CN | 113841681 A | * | 12/2021 | ............ A01M 13/00 |

OTHER PUBLICATIONS

E. Mitcham et al The Mode of action of Insecticidal Controlled Atmospheres, Bull. of Environ. Res. (2006) 96, 213-222.

(Continued)

*Primary Examiner* — Michael H Wang
(74) *Attorney, Agent, or Firm* — Veritay Group, IP PLLC; Susan Fentress

(57) ABSTRACT

Disclosed are the system and method for the process of fumigation. The fumigation system injection cart allows a user to fumigate item(s) that are placed in a poly bag or container. The ambient air from the poly bag or container is sucked out through the vacuum/fumigant outlet line. A desired negative pressure is created in the poly bag or container. A gaseous fumigant is introduced into the poly bag or container through the vacuum/fumigant outlet line. A pressure gauge is configured to monitor the pressure level in the poly bag or container. A fumigant cylinder provides a gaseous fumigant supply through a fumigant tank connector and intake line. A fumigant shutoff valve allows a user to control the flow of the gaseous fumigant. A wheeled hand truck handles allow the user to mobilize the fumigation system injection cart to an application site.

16 Claims, 7 Drawing Sheets

(56) References Cited

U.S. PATENT DOCUMENTS

| | | | |
|---|---|---|---|
| 5,387,403 A | | 2/1995 | Ikeuchi et al. |
| 6,612,067 B2 | | 9/2003 | Topp |
| 6,766,612 B1 | * | 7/2004 | Liu ..................... A01M 17/008 |
| | | | 43/125 |
| 8,800,200 B1 | | 8/2014 | Williams et al. |
| 9,554,568 B1 | * | 1/2017 | Tallon ................... A01M 13/00 |
| D819,902 S | | 6/2018 | Leckrone |
| 2007/0283986 A1 | * | 12/2007 | Baum ..................... A47L 11/34 |
| | | | 134/201 |
| 2012/0186138 A1 | * | 7/2012 | Bell .................... A01M 13/003 |
| | | | 43/124 |
| 2012/0311920 A1 | * | 12/2012 | Olson ..................... A01M 1/20 |
| | | | 43/132.1 |
| 2016/0375167 A1 | * | 12/2016 | Min ........................ A61L 2/208 |
| | | | 422/28 |
| 2017/0127663 A1 | * | 5/2017 | Bourbeau ............. A01M 99/00 |
| 2023/0217915 A1 | * | 7/2023 | Davis .................. B65D 88/121 |
| | | | 220/212 |

OTHER PUBLICATIONS

S. Navarro, The Use of Modified and Controlled Atmpsheres for the disinfection of stored prodcuts, J. Pest Sci. (2012) 85:301-322.

W. Donahue et al. Efficacy of IGI Carbon Dioxide Gas to Kill Ground Squirrels and Pocket Gophers in Underground Burrows Proc 28th Vertebr. Pest Conf (2019).

\* cited by examiner

FUMIGATION SYSTEM INJECTION CART

FIELD OF THE INVENTION

Embodiments of the invention are in the field of fumigation system and method for fumigation of the infested item(s) that are placed in a poly bag or container.

BACKGROUND

Fumigation is a method of pest control or removal of the micro-organism from household items and crops. Fumigation is the process by which users can sterilize the areas by injecting a chemical by which the micro-organism is controlled or, removed from the infested item(s). Pests can be detrimental to humans including animals, plants, and crops. Pests are deleterious to humans in a way of transmission of deadly diseases and causing physical harm like bites and rashes. Pests cause health problems including allergic reactions, respiratory disease, and mental health anguish. Further, bed bugs are small insects that feed solely on the blood of a human, it is difficult to eradicate the bed bugs if they establish their presence in one location. It is also challenging to determine the bite of pests for humans whether it is bed bugs or any other insects. Pests are also harmful to animals by inflicting bites and stings and cause diseases like aflatoxicosis, anthrax, bovine ephemeral fever, etc. The harmful effects of pests are also observed in agriculture and horticulture by feeding on leaves or burrows in stems, fruits, or roots of plants. Plant pests like aphids, thrips, nematodes, etc. cause severe damage to crop and plants.

The process of fumigation involves using a chemical or a mixture of chemicals also known as a fumigant to eliminate pests and insects from infested item(s) or areas. The household fumigants include methyl bromide, sulfuryl fluoride, hydrogen phosphide, etc.

Methyl bromide is a commonly used fumigant but due to its toxic nature and rapid dissipation to the atmosphere, it is dangerous and may cause central nervous system and respiratory system failures. Sulfuryl fluoride is an alternative to methyl bromide, but it has toxic nature too as exposure to sulfuryl fluoride causes nausea, vomiting, abdominal pain, diarrhea, and loss of appetite. Further, these fumigants when introduced to the infested item(s) or area tend to leave behind harmful residues after which proper cleaning of the infested item(s) or area is required. Carbon dioxide ($CO_2$) has proven to be a great alternative to prior treatment chemicals. The mode of action of carbon dioxide in animals including insects is carbon dioxide poisoning which inhibits oxygen utilization by specific enzymes leading to a weak oxidative metabolism resulting in the accumulation of toxic products leading to mortality. These are referred to as hypercarbic atmospheres, $CO_2$ causes a decrease in ATP levels (cellular metabolism) and energy charge in insect tissues. Further, the carbon dioxide fumigant provides a highly effective way to kill a wide range of pests at all stages of the life cycle.

Therefore, the present invention discloses a fumigation system injection cart of portable size and makes use of carbon dioxide fumigant to fumigate any infested item(s) where the infested item(s) is placed in a poly bag or container for fumigation. The fumigation system injection cart can be operated by one user and does not require a plurality of operators to fumigate an item.

SUMMARY OF THE INVENTION

The present invention provides a portable fumigation system injection cart for gaseous fumigation. The fumigation system injection cart includes a wheeled hand truck, a gauge assembly mounted at a middle portion of the wheeled hand truck, wherein the gauge assembly includes a pressure gauge, a vacuum pump fumigant tank upper bracket mounted near a bottom portion of the wheeled hand truck, wherein the vacuum pump fumigant tank upper bracket is enabled to accommodate a vacuum pump, and a vacuum intake line having one end connected to the vacuum pump and the other end connected to the gauge assembly. Further, the fumigation system injection cart includes a fumigant tank lower bracket and a fumigant tank shelf mounted on a back side of the wheeled hand truck to accommodate a fumigant cylinder on the wheeled hand truck and a fumigant tank connector and intake line having one end connected to the fumigant cylinder and the other end connected to the gauge assembly to supply the gaseous fumigant to a poly bag through a fumigant/vacuum outlet line. The fumigant/vacuum outlet line has one end connected to the gauge assembly and the other end connected to a utility box assembly through a first hose quick connector. The utility box assembly is mounted at the bottom portion of the wheeled hand truck, comprises a hose reel attached to the poly bag through a second hose quick connector. The vacuum pump is configured to generate a desired negative pressure in the poly bag by evaluating the ambient air from the poly bag through the hose reel, thereby upwardly moving the ambient air from the hose reel to the fumigant/vacuum outlet line, thereby moving the ambient air into the vacuum intake line. The fumigant/vacuum outlet line is configured to supply the gaseous fumigant from the fumigant cylinder to the poly bag through the hose reel, wherein the hose reel allows a user to spray the gaseous fumigant in the poly bag through a spray gun.

In one exemplary embodiment, the pressure gauge is configured to monitor the pressure levels of the ambient air and the gaseous fumigant.

In another exemplary embodiment, the wheeled hand truck comprises a pair of wheeled hand truck handles at the backside of the wheeled hand truck. The wheeled hand truck comprises a pair of solid wheels to allow the user to mobilize the fumigation system injection cart to an application site.

In yet another exemplary embodiment, the utility box assembly comprises an electrical outlet to provide power supply to the vacuum pump.

The inventive subject matter includes a mobile fumigation method comprising the steps of wheeling a fumigation system injection cart to an application site attaching at least one fumigant cylinder to said upper bracket of the wheeled cart; connecting the fumigant cylinder fumigant tank connector; removing ambient air is removed from the container; and dispersing fumigant into the container, such as a poly bag sized to receive the objects to be fumigated. This method includes the steps of placing the objects to be fumigated inside of the container and sealing said container and then unsealing said container and removing the object from the container after dispersing fumigant into the container.

The inventive subject matter includes various applications including: a method to control borrowing rodent infestation in a landscape. This method includes the steps of rolling the fumigation system injection cart across the landscape in need of rodent control; positioning the dispersal outlet into a rodent hole and dispersing fumigant into the rodent hole.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, explain the principles of the invention.

DETAILED DESCRIPTION OF THE INVENTION

The detailed description of exemplary embodiments herein refers to the accompanying drawings, which show exemplary embodiments by way of illustration and their best mode. While these exemplary embodiments are described in sufficient detail to enable those skilled in the art to practice the inventions, other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Figure 1:
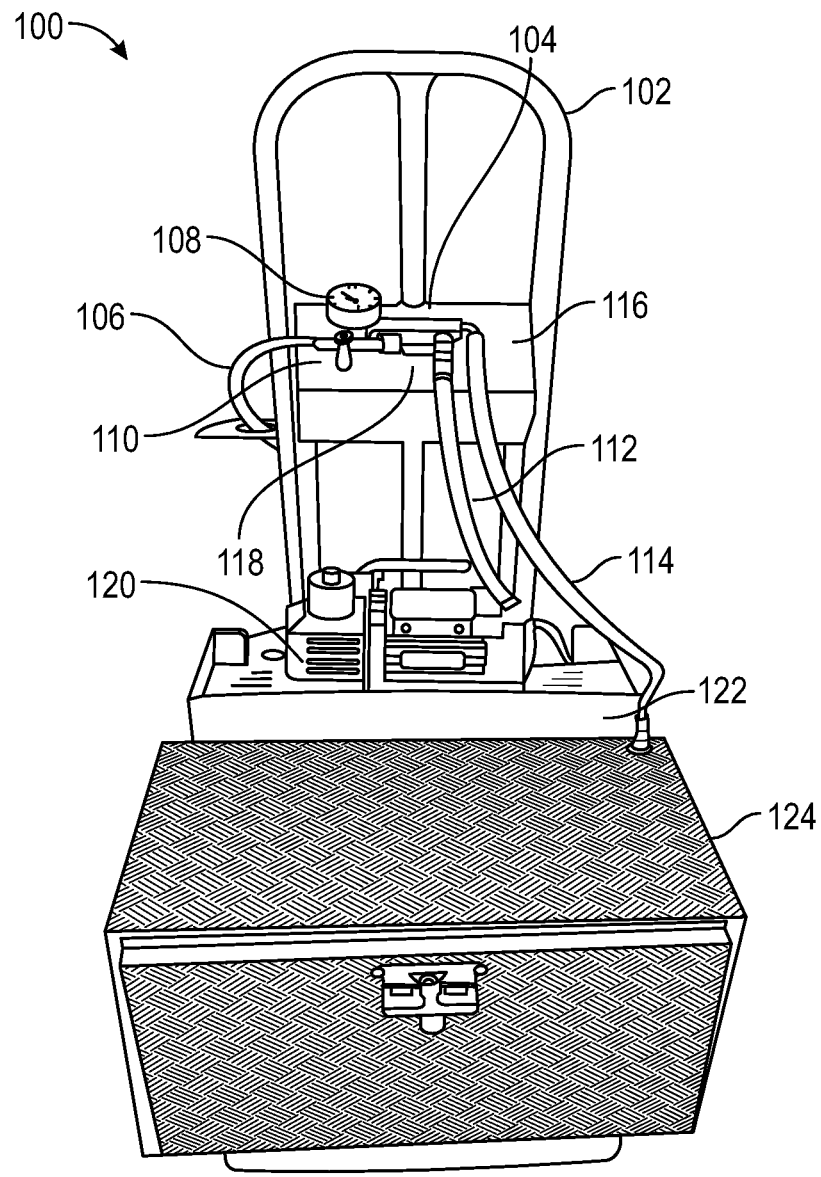
FIG. 1 illustrates a front view of a fumigation system injection cart, in accordance with a preferred embodiment of the present invention.
Figure 5:
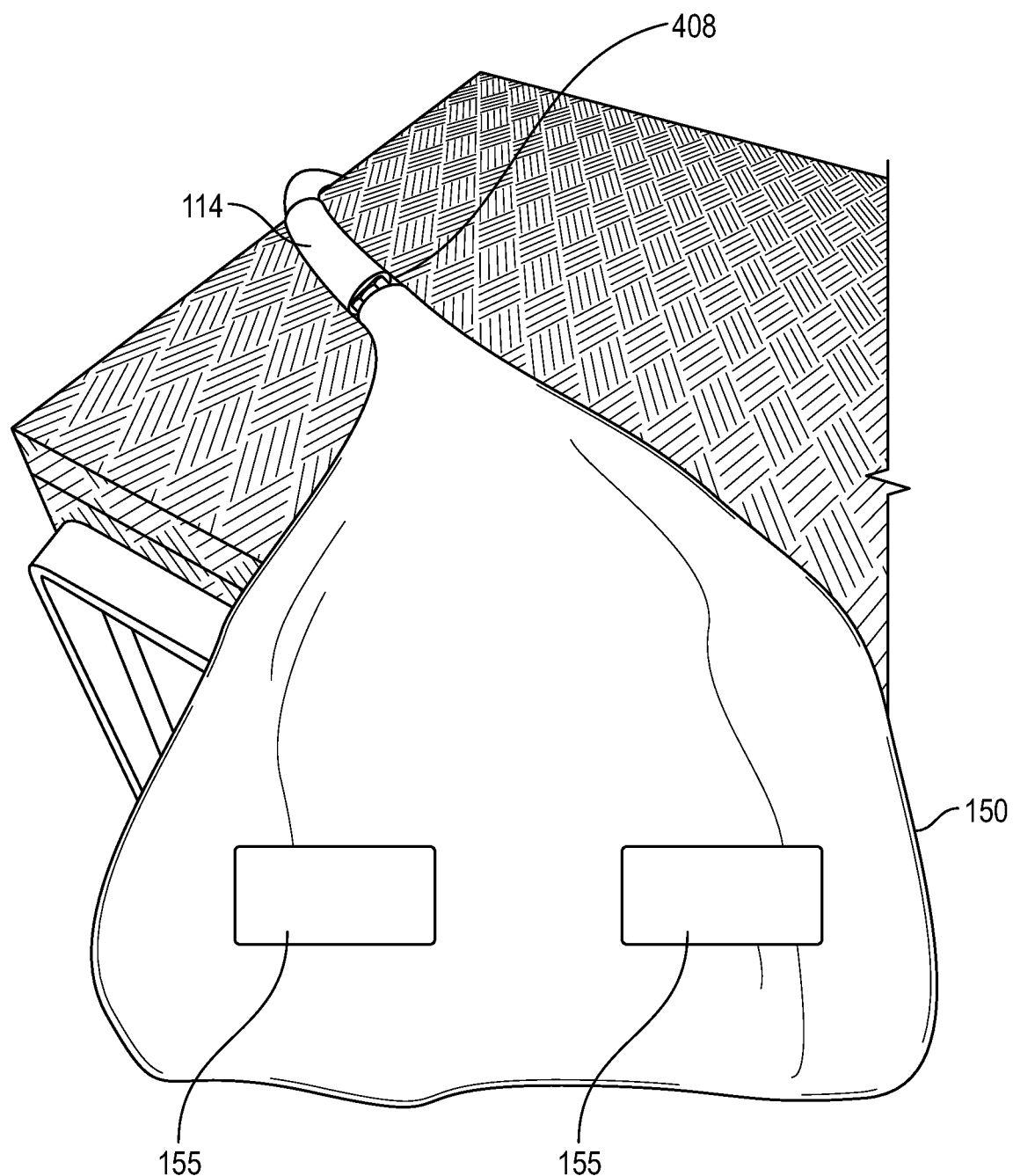
FIG. 5 illustrates the fumigant/vacuum outlet line allows a common flow and control of the ambient air and the gaseous fumigant to and from a poly bag or container.

FIGS. 1 and 5 illustrates a front view of a fumigation system injection cart 100, in accordance with a preferred embodiment of the present invention. The fumigation system injection cart includes a wheeled hand truck 102, a gauge assembly 104, a fumigant tank connector and intake line 106, a pressure gauge 108, a fumigant shutoff valve 110, a vacuum intake line 112, a fumigant/vacuum outlet line 114 a gauge assembly bracket 116 and a vacuum shutoff valve 118. The fumigation system injection cart 100 further includes a vacuum pump 120, a vacuum pump fumigant tank upper bracket 122, and a utility box assembly 124.

The wheeled hand truck 102 allows a user to securely transport fumigant cylinders into a field or a treatment area where the wheeled hand truck 102 is an all-steel tubular constructed frame. The use of the wheeled hand truck 102 permits fumigation in high rise or multifamily dwellings. Additionally, the fumigation system injection cart 100 can be used by a homeowner to treat an infestation of their belongings such as bedding within their home, rather than bringing their items to a fumigation container in a parking lot.

The wheeled hand truck 102 includes two-cylinder support brackets designed to securely hold the fumigant (such as $CO_2$) cylinder with an AC fumigant heater and a regulator. A middle portion of the fumigation system injection cart 100 includes the gauge assembly 104 where the gauge assembly 104 further includes the pressure gauge 108, the fumigant shutoff valve 110, the vacuum intake line 112, the fumigant/vacuum outlet line 114 and the vacuum shutoff valve 118.

The pressure gauge 108 is configured to monitor the pressure level of the vacuum and the gaseous fumigant. The fumigant shutoff valve 110 allows slow discharging of gaseous fumigant from the fumigant cylinders through the fumigant tank connector and intake line 106. Further, the fumigant/vacuum outlet line 114 allows a common flow and control of the ambient air and the gaseous fumigant via a dispersal outlet 408 preferably with a quick connector to and from a poly bag or container 150. The pressure gauge 108, a first end of the fumigant shutoff valve 110, a first end of the vacuum shutoff valve 118, and a first end of the fumigant/vacuum outlet line 114 are mounted on the gauge assembly bracket 116 to form the gauge assembly 104. The vacuum pump 120 is mounted on the vacuum pump fumigant tank upper bracket 122 where the vacuum pump fumigant tank upper bracket 122 is located below the gauge assembly 104. The vacuum pump 120 is enabled to provide desired pressure through the vacuum intake line 112 by evacuating ambient from the poly bag or container 150. The utility box assembly 124 is further located below the vacuum pump fumigant tank upper bracket 122.

Figure 2:
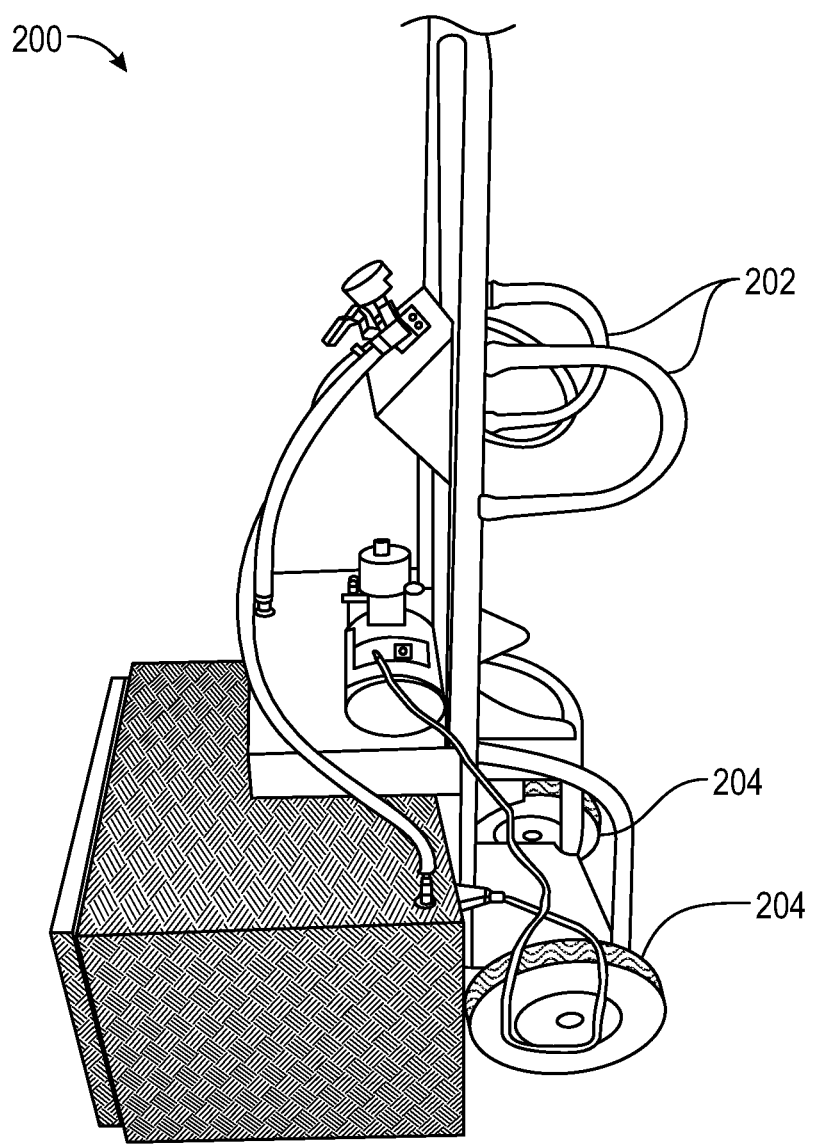
FIG. 2 illustrates a right-side view of the fumigation system injection cart, in accordance with an exemplary embodiment of the present invention.

FIG. 2 illustrates a right-side view 200 of the fumigation system injection cart 100, in accordance with an exemplary embodiment of the present invention. The middle portion of the fumigation system injection cart 100 includes a pair of wheeled hand truck handles 202 at the back side of the fumigation system injection cart 100. The pair of wheeled hand truck handles 202 provides the fumigation system injection cart 100 handling ability to a user. Further, a bottom portion of the fumigation system injection cart 100 includes a pair of solid wheels 204 where the pair of solid wheels 204 allows the user to mobilize the fumigation system injection cart 100 to an application site.

Figure 3:
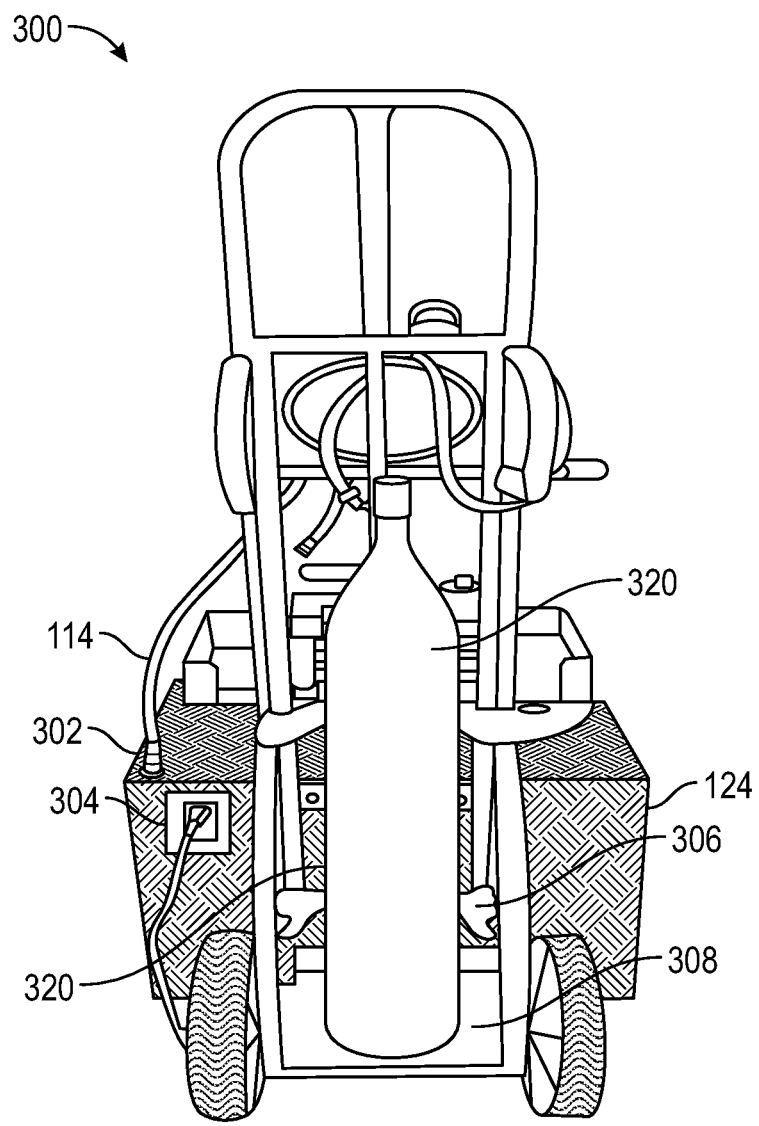
FIG. 3 illustrates a back-side view of the fumigation system injection cart, in accordance with an exemplary embodiment of the present invention.

FIG. 3 illustrates a back-side view 300 of the fumigation system injection cart 100, in accordance with an exemplary embodiment of the present invention. A first hose quick connector 302 connects the fumigant/vacuum outlet line 114 to the utility box assembly 124. The backside of the utility box assembly 124 includes a first electrical outlet 304 where the first electrical outlet 304 is enabled to provide a power supply to the vacuum pump 120 and the AC fumigant heater. The backside of the fumigation system injection cart 100 includes a fumigant tank lower bracket 306 and a fumigant tank shelf 308 where the fumigant tank lower bracket 306 and the fumigant tank shelf 308 provide support to the fumigant cylinders 320 placed securely on the fumigation system injection cart 100.

Figure 4:
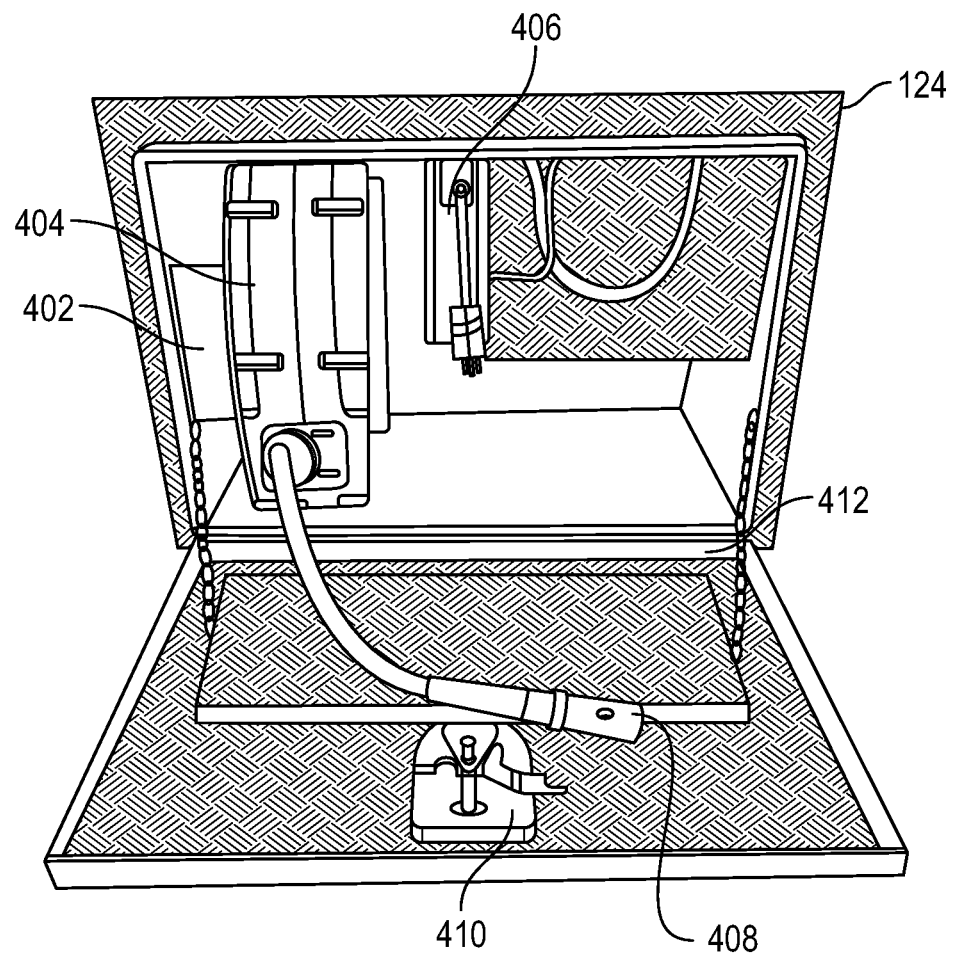
FIG. 4 illustrates a perspective view of the utility box assembly, in accordance with an exemplary embodiment of the present invention.

FIG. 4 illustrates a perspective view of the utility box assembly 124, in accordance with an exemplary embodiment of the present invention. The utility box assembly 124 includes a foam baffle 402, a hose reel 404, an electric cord reel 406, a second electrical outlet (not shown), a second hose quick connector dispersal outlet 408 a locking latch 410 and a door gasket 412. The hose reel 404 with the second hose quick connector 408 is pulled out and connected to the poly bag or container 150. The hose reel 404 with the second hose quick connector dispersal outlet 408 provides a common connection vacuum and gaseous fumigant charging through the same rubber hose. The item(s) to be fumigated is placed inside the poly bag or container. The electric cord reel 406 is plugged into an AC outlet (not shown). Further, the locking latch 410 and the door gasket 412 provide the user a facility to close the door of the utility box assembly 124.

Now referring to FIG. 5, in one exemplary embodiment, the poly bag or container 150 may be of any size needed for the containerized fumigation to take place. The poly bag or container may be small enough to hold an item 155 such a painting that has a destructive bug infestation to a railroad car that is hauling grain and has been infected by grain-eating bugs. For bed bugs, as another example, the poly bag or container will hold the mattress, box springs, pillows, and blankets. The poly bag or container 150 is connected to the fumigation system injection cart 100 by a second hose quick connector 408.

Figure 6A:
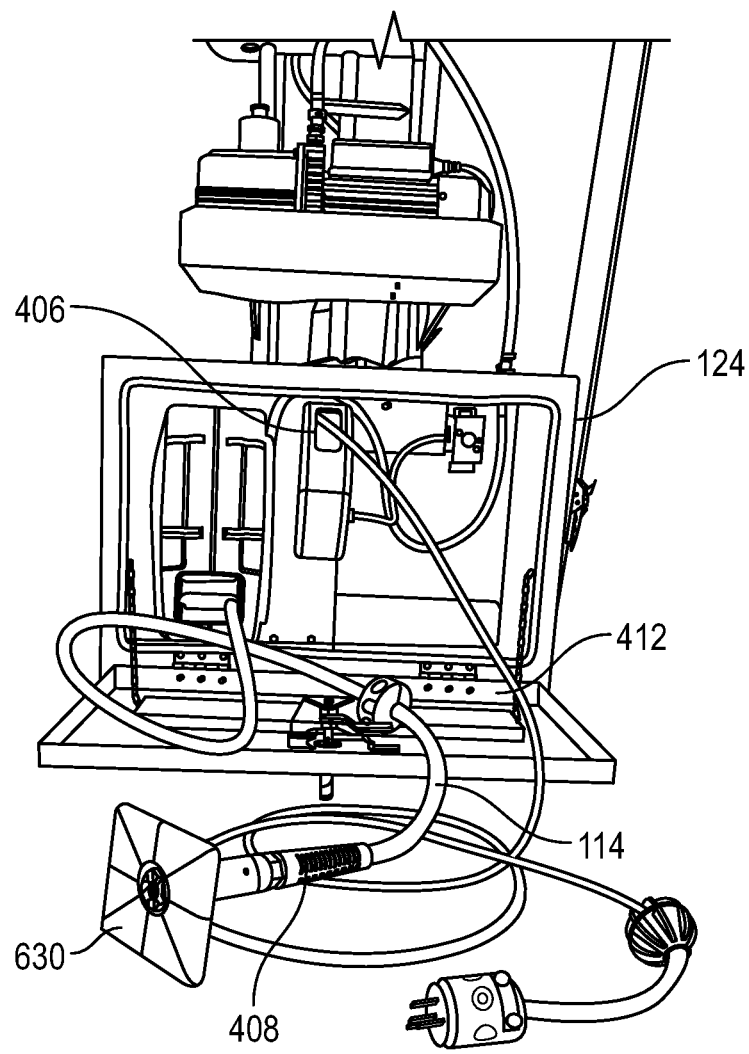
FIG. 6A and FIG. 6B shows exemplary attachments to the fumigation system injection cart.
Figure 6B:
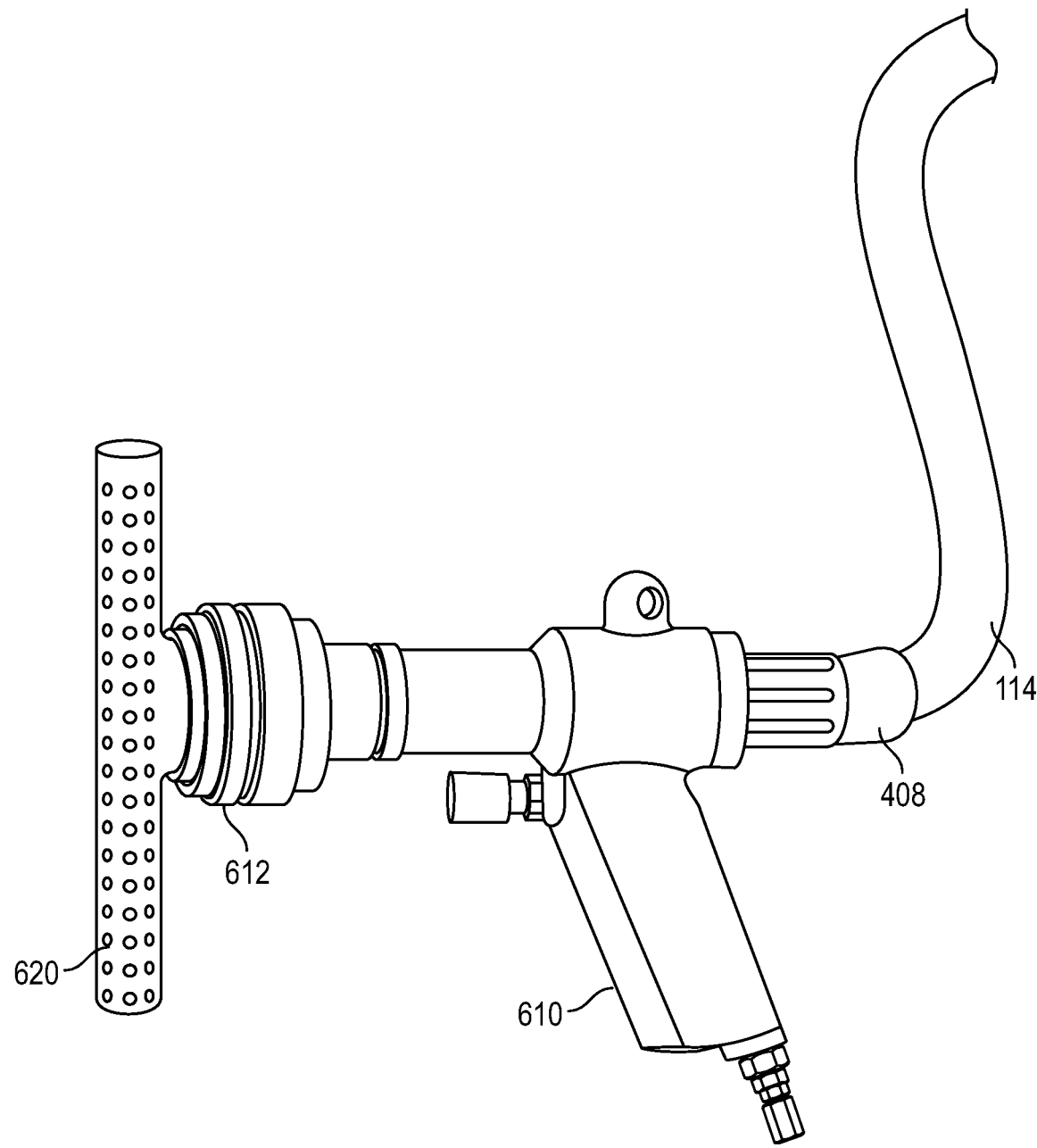

Now referring to FIG. 6A the second hose quick connector dispersal outlet 408 is used to attach a spray gun 610 to the fumigation system injection cart 100. The spray gun 610 in one embodiment has a dispersal attachment 620 attached to an end 612 of the spray gun 610. In this configuration the fumigation system injection cart 100 can be used to inject fumigant into horticultural environment such as a golf course infested with borrowing moles and rats, Now referring to FIG. 6B, in another embodiment, the vacuum channel plate 630 is attached to the container 150 via quick connects with the vacuum channel plate 630 being configured to be placed inside the bag to prevent the container 150 from collapsing during evacuation of the ambient air inside the container 150. The spray gun 610 remains on the outside of the container 150 to control both vacuum and injection of the fumigant gas and is attached to the dispersal outlet 408.

In accordance with an exemplary embodiment of the present invention, the fumigation system injection cart 100 set-up and operation method include attaching the fumigant cylinder to the fumigation system injection cart 100 and strapping it tightly. The AC fumigant heater is screwed onto the fumigant cylinder where the AC fumigant heater is provided power supply by plugging it into the first electrical outlet. The utility box assembly is then opened, and the electric cord reel is unreeled and plugged into an AC outlet present near the location where the fumigation process is to be performed. In one embodiment, a portable battery or generator can be used to provide the required electrical power.

The hose reel is then unreeled and attached to the poly bag or container through the second hose quick connector. The fumigant shutoff valve and the vacuum shutoff valve are set to a suitable position where the suitable position of the fumigant shutoff valve may be 90 degrees to the fumigant tank connector and intake line. The suitable position of the vacuum shutoff valve may be in line (parallel) with the vacuum intake line. Further, the vacuum intake line and the fumigant/vacuum outlet line are connected to the vacuum pump and the utility box assembly, respectively. The vacuum pump is plugged into the first electrical outlet and the pressure gauge is monitored to achieve a desired negative pressure of the vacuum pump. The desired negative pressure is created due to evacuation of the ambient air from the poly bag or container. The desired negative pressure of the vacuum pump is then achieved, and the position of the vacuum shutoff valve is adjusted to the suitable position to shut off any vacuum pressure from the vacuum pump. The vacuum pump is further unplugged from the first electrical outlet to cut off the power supply. The ambient air is removed from the poly bag or container and the gaseous fumigant is then introduced into the poly bag or container to kill whatever pest(s) are present in the item(s) in the poly bag or container.

A cylinder valve and the regulator allow the user to charge the fumigation system injection cart 100 with the gaseous fumigant. The regulator is adjusted by the user to achieve the desired flow of the gaseous fumigant. The fumigant shutoff valve allows the user to slowly discharge the gaseous fumigant where the fumigant shutoff valve is slowly adjusted to the suitable position (in line with the fumigant tank connector and intake line). The pressure gauge allows the user to keep the poly bag or container under the desired pressure. The fumigant/vacuum outlet line is configured to supply the gaseous fumigant from the fumigant cylinder to the poly bag or container through the hose reel where the hose reel allows a user to spray the gaseous fumigant in the poly bag or container through a spray gun. The fumigant shutoff valve is adjusted to the suitable position (90 degrees to the fumigant tank connector and intake line) to cut off the discharge of the gaseous fumigant. The power supply to the AC fumigant heater is cut off from the first electrical outlet. The hose reel is pulled slightly to retract it and the electric cord reel is unplugged from the AC outlet and then retracted. The door gasket of the utility box assembly may be closed using the locking latch. The user then can easily mobilize the fumigation system injection cart 100 to other application sites.

Example, Items for Bed Bug Fumigation

Blankets, Mattress, springs, Bed cover, Pillows, sheets, end tables, headboard, lamp covers, drapes, furniture, including but not limited to bed, chair, cushions, ottoman, sofa; suitcase, personal items, shirts, pants, socks, handkerchief, sweaters, jackets, coats, gloves, sweatshirts, undergarments including underpants, panties, bras, tee shirts, etc., bathroom articles including towels facecloths, etc.

Example: The fumigation system injection cart 100 is a self-contained mobile piece of equipment made to easily access areas where small scale fumigations will take place. The fumigation system injection cart 100 is compact and easily brought up elevators, ramps, and stairs to treat such pests as bed bugs, cockroaches, museum pests and stored product pests. The pest control technician can conduct the entire fumigation easily and efficiently on their own and move to the next fumigation in a brief time thus completing several fumigations in a day.

The pest control technician (user) would take the fumigation system injection cart 100 from the truck or van and place it on the ground, then secure the appropriate gas cylinder to the fumigation system injection cart 100 prior to arriving at application the site. The user will then ensure that the items to be fumigated are placed in the poly bag (this can be done by the homeowner or other responsible person the day before) and placed in an accessible area such as a large room floor or table. The user then proceeds to hook-up the fumigation system injection cart 100 to the container 150 such as a poly bag.

First the user opens the utility box door and plugs the vacuum pump and $CO_2$ heater (if required) into a 110 AC volt wall plug. The vacuum channel plate is attached to the poly bag via quick connects with the plate inside the bag to prevent bag collapse during evacuation of the ambient air inside the bag. The gun remains on the outside of the bag to control both vacuum and injection of the fumigant gas and is attached to the hose (408). Next, attach the gas pressure regulator to the cylinder and then $CO_2$ heater (if required) then connect hose 106 which dispenses the fumigant when needed. The $CO_2$ heater prevents icing of the regulator during operation. Make sure the fumigant valve is off at the tank during the vacuum process.

Next, close the fumigant valve on the fumigation system injection cart 100 and open the vacuum valve 118, turn on the vacuum pump 120 and open the gun 610 to allow evacuation of the ambient air inside the poly bag. When the vacuum pump gauge reads −25 inches of mercury shut off the vacuum pump and close the vacuum valve 118, there should be little air left in the bag and it will conform to the shape of objects in the bag.

The user is now ready to inject the fumigant into the poly bag and its contents. Open the main valve at the fumigant cylinder and check the gauges, adjust the pressure on the heater regulator, open the fumigation valve on the cart 118 and adjust to the desired flow rate, fill the poly bag until turgid then turn off the fumigation valve, unplug the heater and vacuum pump. The gun can be disconnected at this point with the quick disconnect since there is an anti-back flow valve to prevent the fumigant from escaping (blow out) the container. The container and its contents can now sit for the required time, usually less than 24-hours depending on the fumigant, temperature, and contents of the poly bag. Now, use the male coupler of the vacuum hose or a bleed-off hose (not pictured) to safely evacuate the fumigant from the container such as a poly bag to the outside atmosphere as per the label of the fumigant being used. Turn on vacuum pump. The use of a "scrubber" or filtration system can also be employed. This procedure is accomplished in a well-ventilated area, i.e., open windows and doors to allow ample air exchange within the treatment area. User replaces all the components back into the fumigation system injection cart 100 and moves on to the next assignment.

The drawings are not necessarily to scale, and various dimensions may be altered. In certain instances, details that are not necessary for an understanding of the invention or that render other details difficult to perceive may have been omitted. It should be understood, of course, that the invention is not necessarily limited to the embodiments illustrated herein.

The invention claimed is:

1. A fumigation system injection cart, comprising:
   a wheeled hand truck;
   a gauge assembly mounted to the wheeled hand truck, wherein the gauge assembly comprising a pressure gauge,
   an upper bracket mounted near a bottom portion of the wheeled hand truck,
   a vacuum pump attached to the upper bracket;
   a vacuum intake line having one end connected to the vacuum pump and the other end connected to the gauge assembly;
   a lower bracket and a fumigant tank shelf mounted on a back side of the wheeled hand truck configured to accommodate at least one fumigant cylinder on the wheeled hand truck;
   a fumigant tank connector and intake line having one end configured to connect to the fumigant cylinder and the other end connected to the gauge assembly configured to supply the gaseous fumigant to a container through an outlet line;
   and a utility box assembly, wherein the outlet line has one end connected to the gauge assembly and the other end connected to a utility box assembly through a first hose quick connector;
   wherein the utility box assembly is mounted at the bottom portion of the wheeled hand truck, comprises a hose reel attached to the container through a second hose quick connector;
   wherein the vacuum pump is configured to generate a desired negative pressure in the container;
   wherein the outlet line is configured to supply the gaseous fumigant from the fumigant cylinder to a dispersal outlet.

2. The fumigation system injection cart of claim 1, wherein the dispersal outlet is connected to a container configured to receive an object.

3. The fumigation system injection cart of claim 2, wherein the object is selected from the group consisting of: blankets, mattress, springs, bed cover, pillow, and sheet.

4. The fumigation system injection cart of claim 1, wherein the pressure gauge is configured to monitor the pressure levels of the ambient air and the gaseous fumigant.

5. The fumigation system injection cart of claim 1, wherein the wheeled hand truck comprises a pair of solid wheels to allow the user to mobilize the fumigation system injection cart to an application site.

6. The fumigation system injection cart of claim 1, wherein the utility box assembly comprises an electrical outlet to provide power supply to the vacuum pump.

7. The fumigation system injection cart of claim 1, wherein the outlet line is configured to control the flow of the ambient air and the gaseous fumigant to and from the container.

8. The fumigation system injection cart of claim 1, wherein the vacuum pump is configured to generate a desired negative pressure in the container by evacuating the ambient air from the container through the hose reel, thereby upwardly moving the ambient air from the hose reel to the outlet line, thereby moving the ambient air into the vacuum intake line.

9. The fumigation system injection cart of claim 1, wherein the hose reel allows a user to spray the gaseous fumigant in the container through a spray gun.

10. The fumigation system injection cart of claim 9, wherein the spray gun is connected to a vacuum channel plate.

11. A method to control burrowing rodent infestation in a landscape comprising:
    rolling the fumigation system injection cart of claim 1 across the landscape in need of rodent control;
    positioning the dispersal outlet into a rodent hole and, dispersing fumigant into the rodent hole.

12. The method of claim 11 wherein the dispersal outlet is connected to a spray gun.

13. The method of claim 12 wherein the spray gun is connected to a diffuser.

14. A mobile fumigation method comprising the steps of:
    wheeling a fumigation system injection cart to an application site; wherein said wheeled cart is comprised of:
    a gauge assembly mounted to the wheeled cart, wherein the gauge assembly comprising a pressure gauge,
    an upper bracket mounted near a bottom portion of the wheeled cart,
    a vacuum pump attached to the upper bracket;
    a vacuum intake line having one end connected to the vacuum pump and the other end connected to the gauge assembly;
    a lower bracket and a fumigant tank shelf mounted on a back side of the wheeled cart configured to accommodate at least one fumigant cylinder on the wheeled cart;
    a fumigant tank connector and intake line having one end configured to connect to the fumigant cylinder and the other end connected to the gauge assembly configured to supply the gaseous fumigant to a container through an outlet line and a utility box assembly, wherein the outlet line has one end connected to the gauge assembly and the other end connected to a utility box assembly through a first hose quick connector;

wherein the utility box assembly is mounted at the bottom portion of the wheeled hand truck, comprises a hose reel attached to the container through a second hose quick connector;

wherein the vacuum pump is configured to generate a desired negative pressure in the container;

wherein the outlet line is configured to supply the gaseous fumigant from the fumigant cylinder to the container through the hose reel;

attaching at least one fumigant cylinder to said upper bracket of the wheeled cart;

connecting the fumigant cylinder fumigant tank connector;

removing ambient air is removed from the container; and dispersing fumigant into the container.

15. The method of claim 14, comprising placing the objects to be fumigated inside of the container and sealing said container.

16. The method of claim 14, comprising unsealing said container and removing the object from the container after dispersing fumigant into the container.

\* \* \* \* \*